United States Patent [19]

Lawrence

[11] 4,085,094
[45] Apr. 18, 1978

[54] INHIBITING PREMATURE VULCANIZATION OF RUBBERS

[75] Inventor: John P. Lawrence, Stow, Ohio

[73] Assignee: The Goodyear Tire & Rubber Company, Akron, Ohio

[21] Appl. No.: 728,693

[22] Filed: Oct. 1, 1976

[51] Int. Cl.² ............................................. C08F 19/20
[52] U.S. Cl. .............................. 260/79.5 B; 260/780; 260/783; 526/30
[58] Field of Search ..................... 260/79.5 A, 79.5 B, 260/79.5 C, 780

[56] References Cited

U.S. PATENT DOCUMENTS 2,415,627  2/1947  Cooper .......................... 260/79.5 X Primary Examiner—Christopher A. Henderson, Jr.
Attorney, Agent, or Firm—J. A. Rozmajzl

[57] ABSTRACT

Sulfenylthiocarbonates are used to inhibit prevulcanization in rubbers compounded with vulcanization agents. The sulfenylthiocarbonates include methoxycarbonyl 1-dodecyldisulfide; 1,2-bis(methoxycarbonyldithio)-ethane and 1,4-butylenedioxybis(carbonyldithioethane).

5 Claims, No Drawings

INHIBITING PREMATURE VULCANIZATION OF RUBBERS

This invention relates to rubbers containing vulcanization agents, said rubbers possessing improved scorch resistance.

Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calendar smoothly and without lumping, a scorched material often becomes wavy and lumpy after extrusion or sheeting and must be discarded.

An object of the present invention is to provide rubbers containing a vulcanizing agent and having improved scorch resistance. Other objects will become apparent as the description proceeds.

According to the present invention there is provided a method of inhibiting premature vulcanization of rubber containing a vulcanizing agent which comprises having incorporated therein with the vulcanization agent in an amount effective to inhibit premature vulcanization, a compound selected from the group of retarders having the following structural formulae:

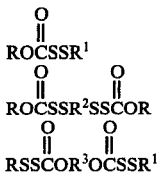

$$\text{ROCSSR}^1 \qquad (I)$$
$$\text{ROCSSR}^2\text{SSCOR} \qquad (II)$$
$$\text{RSSCOR}^3\text{OCSSR}^1 \qquad (III)$$

wherein R is selected from the group consisting of alkyl radicals (straight chain or branched) having 1 to 20 carbon atoms, cycloalkyl radicals having 5 to 7 carbon atoms, aralkyl radicals having 7 to 11 carbon atoms (e.g., benzyl and phenylethyl) and aryl radicals having 6 to 10 carbon atoms, the aryl radicals being unsubstituted or substituted with 1 or 2 radicals selected from the group consisting of alkyl radicals having 1 to 4 carbon atoms and the chloro radical; wherein $R^1$ is a radical described for R with the proviso that when $R^1$ is an alkyl group it is either primary or secondary; $R^2$ is selected from the group consisting of alkylene radicals (straight chain or branched) conforming to the following structural formula:

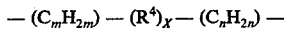

$$-(C_mH_{2m})-(R^4)_X-(C_nH_{2n})-$$

wherein X is 0 or 1, wherein $R^4$ is selected from the group consisting of —O—, —S— and phenylene, wherein when $R^4$ is phenylene or X is 0, m and n are positive whole numbers from 1 to 5 and when $R^4$ is —O— or —S—, m and n are positive whole numbers from 2 to 5, (e.g., $R^2$ can be 2,2¹-oxydiethylene; 2,9-p-menthyl; α, α'-p-xylyl, etc.) and arylene radicals having 6 to 12 carbon atoms, (e.g., $R^2$ can be p-phenylene, 1,4-naphthylene and 4,4'-biphenylene) and $R^3$ is an alkylene radical (straight chain or branched) conforming to the following structural formula:

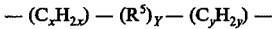

$$-(C_xH_{2x})-(R^5)_Y-(C_yH_{2y})-$$

wherein Y is 0 or 1, wherein $R^5$ is selected from the group consisting of —O—, —S— and phenylene and wherein x and y are positive whole numbers from 2 to 4.

Preferably R and $R^1$ are selected from the group consisting of methyl, ethyl, 1-propyl, 2-propyl, 1-butyl, 1-hexyl, 1-octyl, 1-dodecyl, cyclohexyl, benzyl, 2-butyl, isobutyl and phenyl.

Preferably $R^2$ is selected from the group consisting of 1,2-ethylene; 1,2-propylene; 1,3-propylene; 1,4-tetramethylene; 1,6-hexamethylene; 1,8-octamethylene and 2,2'-oxydiethylene.

Preferably $R^3$ is selected from the group consisting of tetramethylene, hexamethylene and 2,2'-oxydiethylene.

All of the compounds of the present invention can be prepared by well known prior art methods. The method by which the compound is prepared is not critical to its use in the practice of the present invention. The following illustrate and offer general guidelines in the preparation of the compounds of the present invention and are not intended to be limiting.

Chlorocarbonylsulfenyl chloride (U.S. Pat. No. 3,422,452) is reacted with an alcohol as described in German Pat. No. 1,568,632 to form an alkoxycarbonylsulfenyl chloride. The intermediate sulfenyl chloride is then reacted with a thiol to produce a sulfenyl thiocarbonate of type I.

The reaction of two moles of the sulfenyl chloride with one mole of a dithiol will produce a bis(sulfenyl thiocarbonate) of type II.

The reaction of two moles of chlorocarbonylsulfenyl chloride with one mole of a diol provides a bis(alkoxysulfenyl chloride). Reaction of the bis(alkoxysulfenyl chloride) with two moles of a thiol provides a bis(sulfenyl thiocarbonate) of type III.

Compounds of type I where R is an aryl radical must be prepared by an alternate route since chlorocarbonylsulfenyl chloride does not acylate phenols. The desired aryloxy carbonyl compounds can be prepared by reacting chlorocarbonylsulfenyl chloride with a thiol according to German Pat. No. 1,219,925 to produce a chlorocarbonyl hydrocarbyl disulfide. The disulfide is reacted with a phenol in the presence of an acid acceptor such as sodium hydroxide, triethylamine, or pyridine to provide the desired O-aryl sulfenyl thiocarbonate.

Further special techniques must be applied in the synthesis of sulfenyl thiocarbonates where both R and $R^1$ are aryl radicals such aromatic thiols do not react with chlorocarbonylsulfenyl chloride in the desired manner. Chlorocarbonyl aryl disulfides can, however, be obtained by the method reported in German Pat. No. 1,947,952. Chlorocarbonylsulfenyl chloride is reacted with an S-arylthiolcarbamate to provide the chlorocarbonyl aryl disulfide which may in turn be reacted with a phenol as previously described to yield the desired O,S-diaryl sulfenyl thiocarbonate.

The following compounds illustrate but do not limit the compounds of the present invention.
Ethoxycarbonyl 1-propyl disulfide
1-Propoxycarbonyl 2-propyl disulfide
2-Propoxycarbonyl 1-butyl disulfide
1-Butoxycarbonyl 1-hexyl disulfide
2-Butoxycarbonyl 1-octyl disulfide
Isobutoxycarbonyl cyclohexyl disulfide
1-Octyloxycarbonyl benzyl disulfide
Cyclohexyloxycarbonyl phenyl disulfide
1-Decycloxycarbonyl p-chlorophenyl disulfide
1-Hexadecyloxycarbonyl p-tolyl disulfide Benzyloxycarbonyl methyl disulfide
Methoxycarbonyl 1-hexyl disulfide
Phenoxycarbonyl 1-dodecyl disulfide
1,2-Bis(methoxycarbonyldithio)-ethane
1,2-Bis(ethoxycarbonyldithio)-propane
1,4-Bis(1-propoxycarbonyldithio)-butane
1,6-Bis(2-propoxycarbonyldithio)-hexane
$\alpha,\alpha'$°Bis(cyclohexyloxycarbonyldithio)-p-xylene
2,9-Bis(phenoxycarbonyldithio)-p-menthane
1,4-Bis(benzyloxycarbonyldithio)-benzene
2,2'-Bis(1-hexyloxycarbonyldithio)-oxydiethane
4,4'-Bis(1-octyloxycarbonyldithio)-oxybisbenzene
4,4'-Bis(1-decyloxycarbonyldithio)-biphenyl
1,4-Bis(1-hexadecyloxycarbonyldithio)-naphthalene
1,9-Bis(methoxycarbonyldithio)-nonane
1,10-Bis(ethoxycarbonyldithio)-decane
1,2-Bis(p-chlorophenoxycarbonyldithio)-ethane
1,2-Bis(p-tolyloxycarbonyldithio)-ethane
1,4-Butylenedioxybis(carbonyldithioethane)
1,6-Hexylenedioxybis(carbonyldithio-1-propane)
1,8-Octylenedioxybis(carbonyldithio-2-propane)
1,8-Hexylenedioxybis(carbonyldithio-1-dodecane)

The following compounds which were actually prepared and tested as retarders are also illustrative of, but do not limit the compounds of the present invention.

RETARDER NO.

1 1-Butoxycarbonyl 1-dodecyl disulfide
2 Ethoxycarbonyl 1-dodecyl disulfide
3 Methoxycarbonyl 1-dodecyl disulfide
4 Isopropoxycarbonyl 1-dodecyl disulfide
5 Isobutoxycarbonyl 1-dodecyl disulfide
6 2-Butoxycarbonyl 1-dodecyl disulfide
7 1-Octyloxycarbonyl 1-dodecyl disulfide
8 1-Propoxycarbonyl 1-dodecyl disulfide
9 Benzyloxycarbonyl 1-dodecyl disulfide
10 Cyclohexyloxycarbonyl 1-dodecyl disulfide
11 p-Tolyloxycarbonyl 1-dodecyl disulfide
12 Methoxycarbonyl 1-propyl disulfide
13 Methoxycarbonyl 2-propyl disulfide
14 Methoxycarbonyl 1-butyl disulfide
15 Methoxycarbonyl 1-hexyl disulfide
16 Methoxycarbonyl cyclohexyl disulfide
17 Methoxycarbonyl p-chlorophenyl disulfide
18 Methoxycarbonyl phenyl disulfide
19 Methoxycarbonyl benzyl disulfide
20 Methoxycarbonyl ethyl disulfide
21 1,4-Bis(Isopropoxycarbonyldithio)-butane
22 1,2-Bis(1-butoxycarbonyldithio)-ethane
23 1,2-Bis(1-butoxycarbonyldithio)-propane
24 2,2-Bis(1-butoxycarbonyldithio)-oxydiethane
25 1,8-Bis(1-butoxycarbonyldithio)-octane
26 2,2'-Oxydiethylenedioxybis(carbonyldithio-1-dodecane)
27 1,6-Hexylenedioxybis(carbonyldithio-1-dodecane)
28 1,4-Butylenedioxybis(carbonyldithio-1-dodecane)

The performance of the compounds of the present invention as retarders is not dependent upon their method of preparation.

This invention is applicable to rubber mixes containing sulfur-vulcanizing agents, peroxide-vulcanizing agents, organic accelerators for vulcanization and antidegradants, neither being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexyl sulfenamide, 2-mercaptobenzothiazole, N-tert-butyl-2-benzothiazole sulfenamide, 2-benzothiazolyl diethyldithiocarbamate and 2-(morpholinothio)benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators for example, the t-butyl amine salt of mercaptobenzothiazole, and like salts of morpholine and 2,6-dimethyl morpholine can be used in the invention. Thiazole accelerators other than aromatic can be used. Stocks containing accelerators, for example tetramethylthiuram disulfide, tetramethylthiuram monosulfide, aldehyde amine condensation products, thiocarbamylsulfenamides, thioureas, xanthates, and guanidine derivatives are substantially improved using the process of our invention.

The inhibitors of the invention can be used in natural and synthetic rubbers and mixtures thereof. Synthetic rubbers that can be improved by the process of this invention include cis-1,4-polybutadiene, butyl rubber, ethylene-propylene terpolymers, polymers of conjugated 1,3-dienes, for example, homopolymers of butadiene-1,3 or isoprene, copolymers of 1,3-butadiene with other monomers, for example, styrene, acrylonitrile, isobutylene and methyl methacrylate. Ethylene propylene terpolymers, for example ethylene/propylene/-dicyclopentadiene terpolymers can benefit from the present invention. The invention is of particular value with reference to the diene rubbers and the term "rubber" is used herein to include both diene rubber and other rubbers.

The ability of the compounds of the present invention to retard prevulcanization varies with the polymer and/or the accelerator being used. Generally natural rubber benefits more than other polymers. Systems containing sulfenamide accelerators generally benefit to a greater degree than systems where a polythiosulfenamide such as 2-(morpholinodithio)-benzothiazole is used. Systems containing activators such as diphenyl guanidine and tetramethylthiuramdisulfide normally do not benefit as much by the use of the present compounds.

The compounds of the present invention exert a minimal influence on the rate and the state of vulcanization. The influence on either the rate or state can be either slightly positive or negative depending upon the choice of R, $R^1$, $R^2$ or $R^3$ groups. However, it should again be emphasized that the effect is minimal. The negative influence when it occurs is generally most prevalent when $R^1$ is a secondary alkyl radical.

The following examples illustrate but do not limit the preparation of compounds of the present invention.

EXAMPLE I

Methanol (23.3 grams; 0.73 mole) was added dropwise under nitrogen with stirring to 95.5 grams (0.73 mole) of chlorocarbonylsulfenyl chloride. The reaction temperature was maintained at 20° to 30° C. during the addition with a cold water bath. The reaction mixture was then warmed to 45° C. for 4 hours and then stirred at room temperature overnight. Distillation under reduced pressure gave 74.5 grams (80.7%) of methoxycarbonylsulfenyl chloride as a yellow liquid having a boiling point of 75°-80° C. at 100 millimeters of mercury.

To 6.6 grams (0.05 mole) of methoxycarbonylsulfenyl chloride dissolved in 25 milliliters of hexane was added dropwise under nitrogen and with stirring, 3.8 grams (0.5 mole) of 1-propanethiol dissolved in 25 milliliters of hexane. The reaction temperature was held at 0° C. during the addition. The reaction mixture was allowed to warm to room temperature and then was concentrated under reduced pressure to afford 8.3 grams (100%) of pale yellow liquid methoxycarbonyl 1-propyl disulfide.

EXAMPLE II

1-Butoxycarbonylsulfenyl chloride, with a boiling point of 83°–90° C. at 13 mm., was prepared in 84.3% yield by a procedure analogous to that described for methoxycarbonylsulfenyl chloride in Example I by reacting equimolar quantities of 1-butanol and chlorocarbonylsulfenyl chloride. To a stirred solution of 8.4 grams (0.05 mole) of 1-butoxycarbonylsulfenyl chloride and 25 milliliters of hexane was added dropwise with stirring and under nitrogen at 0° C., 4.4 grams (0.025 mole) of 1,8-octanedithiol dissolved in 25 milliliters of hexane. After allowing the solution to warm to room temperature, the solution was concentrated under reduced pressure to give 10.9 grams (98.2%) of 1,8-bis(1-butoxycarbonyldithio)-octane as a pale yellow liquid.

EXAMPLE III 1,4-Butanediol (10.8 grams, 0.12 mole) was added dropwise to a stirred solution of 41.2 grams (0.31 mole) of chlorocarbonylsulfenyl chloride under nitrogen. The temperature was allowed to rise to 40°–45° C. The reaction mixture was then heated to 50° C. for two hours after the addition. Upon concentration under reduced pressure, 31.2 grams (93.2%) of 1,4butoxybis(carbonylsulfenyl chloride) was obtained as a yellow liquid.

To 5,6 grams (0.02 mole) of 1,4-butoxybis(carbonylsulfenyl chloride) dissolved in 50 milliliters of hexane was added with stirring under nitrogen at 0° C., 8.1 grams (0.04 mole) of 1-dodecanethiol dissolved in 25 milliliters of hexane. The solution was allowed to warm to room temperature, then concentrated under reduced pressure to afford 12.2 grams (100%) of 1,4-butylenedioxybis(carbonyldithio-1-dodecane) as a waxy white solid with a melting point of 45°–48° C.

Natural rubber and butadiene/styrene rubber (SBR) were compounded with various retarders of this invention. Comparisons were made using different accelerators. The formulations and test results are shown below. None of these embodiments are to be considered limiting as to the scope of the present invention, but merely illustrative. All parts, unless indicated otherwise, are parts by weight.

The following base stocks, A and B, were used to evaluate the retarders.

Table 1

| Base Stocks | A | B |
|---|---|---|
| | Parts by Weight | |
| Natural rubber | 100.0 | — |
| SBR 1712 | — | 137.5 |
| HAF Black | 50.0 | — |
| ISAF Black | — | 68.0 |
| Zinc Oxide | 3.0 | 5.0 |
| Stearic Acid | 3.0 | 1.5 |
| Processing Oil | 3.0 | |
| Sulfur | 2.5 | 1.5 |
| Amine Antioxidant | 1.0 | |
| | 162.5 | 213.5 |

Mooney Scorch (T$\Delta$5) data was obtained at 270° F. to measure (in minutes) scorch inhibition periods.

Table 2

| | (Natural Rubber)[a] | |
| Retarder No. | phr (b) | T$\Delta$5 |
|---|---|---|
| Control | — | 12.9 |
| 1 | 0.84 | 19.2 |
| 2 | 0.77 | 18.2 |
| 3 | 0.73 | 21.1 |
| 4 | 0.80 | 19.1 |
| 5 | 0.84 | 19.3 |
| 6 | 0.84 | 17.4 |
| 7 | 0.98 | 20.7 |
| 8 | 0.80 | 19.4 |
| 9 | 0.92 | 20.6 |
| 10 | 0.90 | 18.6 |
| 11 | 0.92 | 19.0 |

(a)Stock A, 0.5 phr 2-(morpholinothio)-benzothiazole.
(b)2.5 m moles/100 g rubber.

Table 3

| | (Natural Rubber)[a] | |
| Retarder No. | phr (b) | T$\Delta$5 |
|---|---|---|
| Control | — | 14.1 |
| 12 | 0.42 | 20.5 |
| 13 | 0.42 | 17.0 |
| 14 | 0.45 | 20.1 |
| (c) | 0.45 | 14.6 |
| 15 | 0.52 | 21.6 |
| 16 | 0.52 | 15.7 |
| (d) | 0.73 | 20.2 |
| 17 | 0.59 | 16.5 |
| 18 | 0.50 | 17.8 |
| 19 | 0.54 | 20.5 |
| 20 | 0.38 | 19.6 |

(a)Stock A, 0.5 phr 2-(morpholinothio)-benzothiazole
(b)2.5 m moles/100 g rubber
(c)Methoxycarbonyl t-butyl disulfide
(d)Methoxycarbonyl 1-dodecyl disulfide Table 4

| | (Natural Rubber)[a] | |
| Retarder No. | phr (b) | T$\Delta$5 |
|---|---|---|
| Control | — | 12.8 |
| 21 | 0.72 | 16.8 |
| 22 | 0.72 | 17.2 |
| 23 | 0.74 | 16.5 |
| 24 | 0.80 | 16.0 |
| 25 | 0.88 | 18.1 |
| 26 | 1.25 | 22.1 |
| 27 | 1.28 | 22.3 |
| 28 | 1.22 | 20.2 |

(a)Stock A, 0.5 phr 2-(morpholinothio)-benzothiazole.
(b)2.0 m moles/100 g rubber.

As indicated by the above data in Tables 2 to 4 every single compound acted as a retarder regardless of the polymer or accelerator system used. The only exception was methoxycarbonyl t-butyl disulfide which is not a compound within the scope of the present invention.

Stock A was compounded with three different accelerator systems, i.e. 0.5 part N-cyclohexyl benzothiazole-2-sulfenamide; 0.5 part 2-(morpholinodithio)-benzothiazole; and a combination of 0.5 part 2-(morpholinodithio)-benzothiazole, 0.75 part resorcinol and 1.5 part hexamethylenetetramine. Retarder No. 15 and methoxycarbonyl 1-dodecyl disulfide were evaluated separately in the above systems. Each acted as a retarder.

Stock B was compounded with 1.0 part 2-(morpholinodithio)-benzothiazole; 1.0 part N-cyclohexyl benzothiazole-2-sulfenamide; and a combination of 1.0 part benzothiazole disulfide and 0.75 diphenyl guanidine. Retarder No. 15 and methoxycarbonyl 1-dodecyl disulfide were evaluated in each system and acted in a retarding manner.

The above examples are not intended to be limiting, but rather illustrative. Any of the retarders, accelerators and rubbers described earlier herein can be substituted in the preceding examples to obtain retardation effects.

In addition the levels of the retarders and other components in said examples could be altered in accordance with the general teachings herein and retardation effects would be obtained. Peroxides, such as dicumyl peroxides, could also be used in said examples with or without the presence of sulfur and/or sulfur donating compounds.

Retarders within the practice of the present invention other than those described in the preceding examples have been synthesized and tested positively as retarders.

The retarders of this invention may be used at concentrations of from 0.10 part to 5.0 parts by weight of retarder per 100 parts by weight of rubber and even from 0.05 to 10.0 parts. Preferably the concentration ranges from 0.25 to 5.0 parts, more preferably from 0.25 to 3.0 parts and most preferably from 0.25 to 1.50 parts.

The retarders of the present invention are preferably added to the rubbery polymer at the same time that the accelerator is added, although this order of addition is not necessary to the successful utilization of the compounds of this invention.

The data in the preceding working examples are representative of the fact that the compounds of the present invention are effective as retarders in the presence of organic accelerators whether they are diaryl guanidines such as diphenyl-guanidine, or thiazoles, more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(morpholinothio)-benzothiazole and N-cyclohexyl-2-benzothiazolesulfenamide, i.e. regardless of what type of organic accelerator is used. Thiuram sulfides such as tetramethyl thiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the Vanderbilt Rubber Handbook, 1968 Edition, R. T. Vanderbilt Company, Inc., particularly at pages 242 to 244 and also in the bulletin of the Elastomer Chemicals Dept. of the E. I. du Pont de Nemours and Co. (Inc.) entitled "Accelerators, Vulcanizing Agents and Retarders, Brochure No. SDA54457."

The polymers in which the retarders of the present invention are incorporated remain suitable for their art recognizing uses, e.g., in tires and industrial products.

While certain representative embodiments and details have been shown for the purpose of illustrating the invention, it will be apparent to those skilled in this art that various changes and modifications may be made therein without departing from the spirit or scope of the invention.

What I claim is:

1. A composition comprising a vulcanizable diene polymer containing a sulfenylthiocarbonate selected from the group of retarders having the following structural formulae

wherein R is selected from the group consisting of alkyl radicals having 1 to 20 carbon atoms, cycloalkyl radicals having 5 to 7 carbon atoms, aralkyl radicals having 7 to 11 carbon atoms and aryl radicals having 6 to 10 carbon atoms, the aryl radicals being unsubstituted or substituted with 1 or 2 radicals selected from the group consisting of alkyl radicals having 1 to 4 carbon atoms and the chloro radical; wherein $R^1$ is a radical described for R with the proviso that when $R^1$ is an alkyl group it is either primary or secondary; $R^2$ is selected from the group consisting of alkylene radicals conforming to the following structural formula:

$$-(C_mH_{2m})-(R^4)_X-(C_nH_{2n})-$$

wherein X is 0 or 1, wherein $R^4$ is selected from the group consisting of —O—, —S— and phenylene, wherein when $R^4$ is phenylene or X is O, m and n are positive whole numbers from 1 to 5 and when $R^4$ is —O— or —S—, m and n are positive whole numbers from 2 to 5, and arylene radicals having 6 to 12 carbon atoms, and $R^3$ is an alkylene radical conforming to the following structural formula:

$$-(C_xH_{2x})-(R^5)_Y-(C_yH_{2y})-$$

wherein Y is 0 or 1, wherein $R^5$ is selected from the group consisting of —O—, —S— and phenylene and wherein x and y are positive whole numbers from 2 to 4.

2. The composition according to claim 1 wherein the rubber contains a sulfur vulcanization agent.

3. The composition according to claim 2 wherein the rubber contains an organic vulcanization accelerating agent selected from the group consisting of thiazoles, diaryl guanidines and thiuram sulfides.

4. The composition according to claim 1 wherein R and $R^1$ are selected from the group consisting of methyl, ethyl, 1-propyl, 2-propyl, 1-butyl, 1-hexyl, 1-octyl, 1-dodecyl, cyclohexyl, benzyl, 2-butyl, isobutyl and phenyl, $R^2$ is selected from the group consisting of 1,2-ethylene; 1,2-propylene; 1,3-propylene; 1,4-tetramethylene; 1,6-hexamethylene; 1,8-octamethylene and 2,2'-oxydiethylene and $R^3$ is selected from the group consisting of tetramethylene, hexamethylene and 2,2'-oxydiethylene.

5. The composition according to claim 1 wherein the sulfenylthiocarbonate is selected from the group consisting of 1-butoxycarbonyl 1-dodecyl disulfide; methoxycarbonyl 1-dodecyl disulfide and methoxycarbonyl 2-propyl disulfide.

* * * * *

UNITED STATES PATENT AND TRADEMARK OFFICE
CERTIFICATE OF CORRECTION

PATENT NO. : 4,085,094
DATED : April 18, 1978
INVENTOR(S) : John P. Lawrence

It is certified that error appears in the above-identified patent and that said Letters Patent are hereby corrected as shown below:

Column 5, Line 2 should read -- (0.05 mole)-- instead of "(0.5 mole)".

Signed and Sealed this

Tenth Day of October 1978

[SEAL]

Attest:

RUTH C. MASON
*Attesting Officer*

DONALD W. BANNER
*Commissioner of Patents and Trademarks*